(12) United States Patent
Ichikawa et al.

(10) Patent No.: US 6,620,061 B1
(45) Date of Patent: Sep. 16, 2003

(54) GOLF BALL

(75) Inventors: Yasushi Ichikawa, Chichibu (JP); Jun Shindo, Chichibu (JP); Rinya Takesue, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 141 days.

(21) Appl. No.: 09/609,924

(22) Filed: Jul. 5, 2000

(30) Foreign Application Priority Data

Jul. 7, 1999 (JP) .......................................... 11-193565

(51) Int. Cl.$^7$ ............................................... A63B 37/12
(52) U.S. Cl. ........................................................ 473/378
(58) Field of Search ................................ 473/373, 374, 473/376, 377, 367, 368, 370, 371, 378

(56) References Cited

U.S. PATENT DOCUMENTS

| | | | |
|---|---|---|---|
| 3,791,655 A | * 2/1974 | Schweiker et al. | ......... 473/372 |
| 4,082,288 A | 4/1978 | Martin et al. | |
| 4,714,253 A | * 12/1987 | Nakahara et al. | ........... 473/373 |
| 4,863,167 A | * 9/1989 | Matsuki et al. | ............. 473/373 |
| 4,919,434 A | * 4/1990 | Saito | ........................... 473/373 |
| 4,955,966 A | 9/1990 | Yuki et al. | |
| 5,141,233 A | * 8/1992 | Yuki et al. | ................... 523/206 |
| 5,314,187 A | * 5/1994 | Proudfit | ....................... 473/373 |
| 5,574,107 A | 11/1996 | Hiraoka et al. | |
| 5,688,595 A | 11/1997 | Yamagishi et al. | |
| 5,792,009 A | * 8/1998 | Maruko | ....................... 473/359 |
| 6,152,836 A | * 11/2000 | Bradley et al. | ............. 473/378 |

FOREIGN PATENT DOCUMENTS

| | | |
|---|---|---|
| EP | 0 264 522 A1 | 4/1988 |
| EP | 0 577 058 A1 | 1/1994 |
| EP | 1 068 883 A3 | 1/2001 |

* cited by examiner

*Primary Examiner*—Mark S. Graham
*Assistant Examiner*—Raeann Gordon
(74) *Attorney, Agent, or Firm*—Sughrue Mion, PLLC

(57) ABSTRACT

In a golf ball comprising a core and an enclosure of one or more layers enclosing the core, at least one enclosure layer is formed of a rubber composition comprising a base rubber based on 1,4-polybutadiene having a cis-1,4-structure, an α,β-unsaturated carboxylic acid, a metal oxide, and a polymerization initiator. The rubber composition is subjected to crosslinking reaction. The ball has a great resilience, pleasant feel, good controllability upon iron shots, and high resistance against flaw on the cover surface.

10 Claims, 1 Drawing Sheet

GOLF BALL

This invention relates to a golf ball comprising a core and an enclosure of one or more layers enclosing the core, and more particularly, to a golf ball of such structure which has a great resilience, a good feel when hit, ease of control upon iron shots, and minimized flaw on the cover surface.

BACKGROUND OF THE INVENTION

Traditional cover stocks used in prior art golf balls include ionomer resins and trans-polyisoprene rubber which is also known as balata rubber. In particular, the golf balls using balata rubber win the favor of those golfers who take more account of control and feel.

The balata covers, however, are inferior to the ionomer covers with respect to resilience, distance, and scuff resistance upon iron shots. They need further improvements. There is a desire to have a golf ball which not only has a great resilience and distance, but is also improved in scuff resistance, controllability and feel.

SUMMARY OF THE INVENTION

An object of the invention is to provide a novel and improved golf ball comprising a core and an enclosure of one or more layers enclosing the core wherein the enclosure is improved so as to acquire a great resilience, extended distance and pleasant feel and enhance scuff resistance and controllability.

Regarding a golf ball comprising a core and an enclosure of one or more layers enclosing the core, the inventor has found that when at least one enclosure layer is formed of a rubber composition comprising a base rubber based on polybutadiene having a cis-1,4-structure, an α,β-unsaturated carboxylic acid, a metal oxide, and a polymerization initiator in a specific proportion, quite unexpectedly the resulting golf ball is endowed with good controllability and pleasant feel similar to balata rubber and satisfies all the requirements of resilience (or rebound), flight distance and scuff resistance.

Accordingly, the invention provides a golf ball comprising a core and an enclosure of one or more layers enclosing the core. At least one layer of the enclosure is formed from a rubber composition comprising 100 parts by weight of a base rubber based on a polybutadiene having at least 40% of cis-1,4-structure, 5 to 40 parts by weight of an α,β-unsaturated carboxylic acid, 5 to 40 parts by weight of a metal oxide, and 0.1 to 5 parts by weight of a polymerization initiator, by subjecting the rubber composition to crosslinking reaction.

DESCRIPTION OF THE PREFERRED EMBODIMENTS

Figure 1:
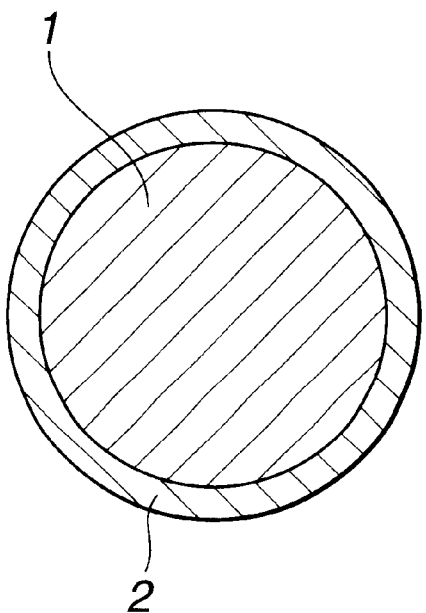
FIG. 1 is a schematic cross-sectional view of a two-piece golf ball according to one embodiment of the invention.

Briefly stated, the invention pertains to a golf ball comprising a core and an enclosure of one or more layers enclosing the core, wherein at least one enclosure layer is formed by subjecting to crosslinking reaction a rubber composition comprising (1) a base rubber, (2) an α,β-unsaturated carboxylic acid, (3) a metal oxide, and (4) a polymerization initiator as essential components.

The base rubber (1) has blended therein a polybutadiene having at least 40% of cis-1,4-structure. Use may be made of commercially available rubber products such as BR01 by Japan Synthetic Rubber K.K. The content of the polybutadiene in the base rubber is not critical although it is recommended that the base rubber contain at least 50% by weight, more preferably at least 76% by weight, and further preferably at least 80% by weight of the polybutadiene. The polybutadiene content of less than 50% by weight may sometimes lead to substantial losses of resilience, scuff resistance and durability against strikes. While the base rubber is composed mainly of the polybutadiene, there may be blended other rubber components such as isoprene rubber and trans-polyisoprene rubber.

The α,β-unsaturated carboxylic acid (2) is not critical. For example, acrylic acid and methacrylic acid are advantageously used, with methacrylic acid being preferred for durability. In the rubber composition, the α,β-unsaturated carboxylic acid is blended in an amount of at least 5 parts, especially at least 10 parts by weight and up to 40 parts, especially up to 30 parts by weight, per 100 parts by weight of the base rubber. Less amounts of α,β-unsaturated carboxylic acid may fail to provide a sufficient hardness (or click) and resilience whereas larger amounts may render the ball hard and brittle, resulting in losses of durability against strikes, scuff resistance and resilience.

The metal oxide (3) is selected, for example, from zinc oxide, magnesium oxide and calcium oxide, with zinc oxide being especially preferred. In the rubber composition, the metal oxide is blended in an amount of at least 5 parts, especially at least 10 parts by weight and up to 40 parts, especially up to 30 parts by weight, per 100 parts by weight of the base rubber. Less amounts of the metal oxide may fail to provide the ball with a sufficient hardness, durability against strikes and scuff resistance whereas larger amounts may render the ball hard and brittle, resulting in losses of durability against strikes, scuff resistance and resilience.

It is recommended that the rubber composition contain the α,β-unsaturated carboxylic acid (2) and the metal oxide (3) in a molar ratio from 3:1 to 1:1 and especially from 2:1 to 1:1. If the ratio of component (2) to component (3) exceeds the range, sufficient resilience may not be achieved. If the ratio of component (2) to component (3) is below the range, the enclosure layer may become hard and brittle, leading to some losses of durability against repetitive strikes and scuff resistance against iron full shots.

The polymerization initiator (4) is preferably selected from organic peroxides. Exemplary are dicumyl peroxide, t-butyl peroxybenzoate, t-butyl cumyl peroxide, and 1,1-bis (t-hexylperoxy)cyclohexane. Of these, dicumyl peroxide and 1,1-bis(t-hexylperoxy)cyclohexane are preferred. In the rubber composition, the polymerization initiator is blended in an amount of at least 0.1 part, especially at least 1.0 parts by weight and up to 5.0 parts, especially up to 4.0 parts by weight, per 100 parts by weight of the base rubber. Outside this range, a robust golf ball having an optimum hardness may not be obtained.

According to the invention, the enclosure layer is formed of a layer-forming material in the form of a rubber composition comprising the above-described components (1) to (4) as essential components. In the rubber composition, other components may be blended if necessary. Such optional components include inert fillers such as barium sulfate, calcium carbonate, zinc carbonate, silica and titanium dioxide, and antioxidants.

The golf ball of the invention has at least one enclosure layer formed of a composition comprising components (1) to (4) while the enclosure layer is formed directly around the core or around the core with another enclosure layer interposed between the enclosure layer and the core.

Figure 2:
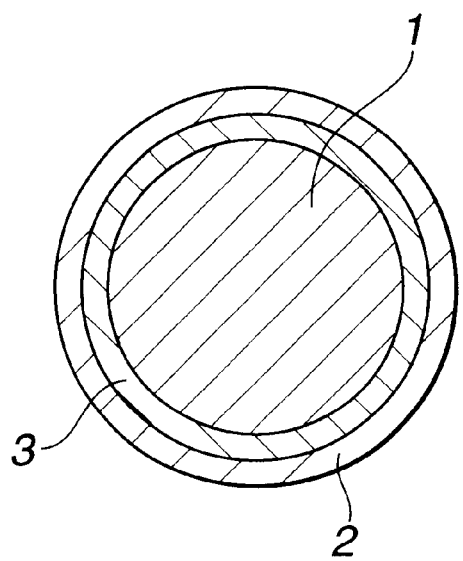
FIG. 2 is a schematic cross-sectional view of a three-piece golf ball according to another embodiment of the invention.

Referring to FIGS. 1 and 2, the enclosure around the core used herein is illustrated. FIG. 1 illustrates in cross section a two-piece solid golf ball in which a core 1 is enclosed with a cover 2. FIG. 2 illustrates in cross section a three-piece golf ball having a core 1, a cover 2, and an intermediate layer 3 formed therebetween. The enclosure used herein designates a single layer or a plurality of layers enclosing the core and specifically, the cover 2 in the embodiment of FIG. 1 and the cover 2 or the intermediate layer 3 or both in the embodiment of FIG. 2. A multilayer structure of three or more layers may be formed around the core, though not shown in the illustrated embodiments, and in this embodiment, these layers are the enclosure layers.

In the golf ball of the invention, the cover 2 in the embodiment of FIG. 1 and the cover 2 and/or the intermediate layer 3 in the embodiment of FIG. 2 is formed of the rubber composition comprising components (1) to (4). Where the enclosure is of a multilayer structure, it suffices that at least one of the enclosure layers is formed of the rubber composition. All enclosure layers can be formed of rubber compositions as defined above.

In the practice of the invention, the golf ball is obtained by first preparing a core on which the enclosure is to be formed. The core may be formed by well-known methods. For improving scuff resistance and durability, it is preferred to use a rubber composition comprising 100 parts by weight of a base rubber based on a polybutadiene having at least 40% of cis-1,4-structure, 5 to 40 parts by weight of a metal salt of an α,β-unsaturated carboxylic acid, 0 to 40 parts by weight of a metal oxide, and 0.1 to 5 parts by weight of a polymerization initiator, as the core in combination with the enclosure according to the invention.

The base rubber has blended therein a polybutadiene having at least 40% of cis-1,4-structure. Use may be made of commercially available rubber products such as BR01 by Japan Synthetic Rubber K.K. While the base rubber is composed mainly of the polybutadiene, there may be blended other rubber components such as isoprene rubber and trans- polyisoprene rubber. The content of the polybutadiene in the base rubber is not critical although it is recommended that the base rubber contain at least 50% by weight, more preferably at least 76% by weight, and further preferably at least 80% by weight of the polybutadiene. The polybutadiene content of less than 50% by weight may sometimes lead to substantial losses of resilience, scuff resistance and durability against strikes.

Examples of the metal salt of α,β-unsaturated carboxylic acid include metal salts, typically zinc, magnesium and calcium salts of acrylic acid and methacrylic acid, especially methacrylic acid. Of these, zinc methacrylate is most preferred. In the rubber composition, the metal salt of α,β-unsaturated carboxylic acid is blended in an amount of at least 5 parts, especially at least 10 parts by weight and up to 40 parts, especially up to 30 parts by weight, per 100 parts by weight of the base rubber. Less amounts of α,β-unsaturated carboxylic acid metal salt may fail to provide a sufficient hardness (or click) and resilience whereas larger amounts may render the ball hard and brittle, resulting in losses of durability against strikes, scuff resistance and resilience.

Examples of the metal oxide are the same as described for the enclosure-forming rubber composition. In the rubber composition, the metal oxide is blended in an amount of up to 40 parts, especially up to 30 parts by weight, per 100 parts by weight of the base rubber. In the core-forming rubber composition, a large amount of the metal oxide, typically zinc oxide may be blended as in the enclosure-forming rubber composition, and in combination with the metal salt of α,β-unsaturated carboxylic acid. From the standpoints of hardness, resilience and durability, it is recommended to use the metal salt of α,β-unsaturated carboxylic acid in the above-defined amount and the metal oxide in a limited amount of up to 40 parts, especially up to 30 parts by weight, per 100 parts by weight of the base rubber. Too large amounts of the metal oxide may render the ball hard, resulting in a loss of durability.

Organic peroxides are also typical of the polymerization initiator. Exemplary are dicumyl peroxide, t-butyl peroxybenzoate, t-butyl cumyl peroxide, and 1,1-bis(t-hexylperoxy)cyclohexane. Of these, dicumyl peroxide and 1,1-bis(t-hexylperoxy)cyclohexane are preferred. In the core-forming rubber composition, the polymerization initiator is blended in an amount of at least 0.1 part, especially at least 1.0 parts by weight and up to 5.0 parts, especially up to 4.0 parts by weight, per 100 parts by weight of the base rubber. Outside this range, it may become difficult to produce a robust core having an optimum hardness.

In the core-forming rubber composition, other components may be blended if necessary. Such optional components include inert fillers such as barium sulfate, calcium carbonate, zinc carbonate, silica and titanium dioxide, and antioxidants.

The core is prepared by adding the base rubber, metal salt of α,β-unsaturated carboxylic acid, and optionally, the metal oxide and inert filler to a conventional mixer, fully milling the components at a temperature of about 60 to 110° C., cooling the mixture below the decomposition temperature of the polymerization initiator, adding the polymerization initiator to the mixture, and fully milling the contents to give a core-forming rubber composition.

The core-forming rubber composition is molded into a slug in the unvulcanized or semi-vulcanized state, and heat molded under pressure at a temperature of about 145 to 180° C. for about 10 to 30 minutes. The molded part is then cooled and buffed on the surface, yielding a core.

The core thus obtained usually has a diameter of at least 20 mm, especially at least 25 mm and up to 41 mm, especially up to 38 mm although the core diameter is not critical. Also the core usually has a hardness of at least 55, especially at least 60 and up to 90, especially up to 85 on JIS-C hardness scale although the core hardness is not critical.

Thereafter, the enclosure layer or layers are formed around the core. Where the enclosure layer is formed of a rubber composition comprising the above-described components (1) to (4), it is recommended, though not critical, to pick up the α,β-unsaturated carboxylic acid (2) and metal oxide (3) from components (1) to (4), previously react the components (2) and (3), then blend the reaction product with the 1,4-polybutadiene (1) and polymerization initiator (4). The previous reaction of components (2) and (3) ensures the manufacture of a golf ball which has a pleasant feel when hit and improved controllability upon iron shots. Especially when the enclosure is a ball surface layer (that is, single layer cover or cover outermost layer), the previous reaction contributes to improvements in scuff resistance and durability against repetitive strikes.

It is not critical how to blend the 1,4-polybutadiene (1) and polymerization initiator (4). The composition may be prepared by well-known methods. Typically, the 1,4-polybutadiene (1) and a suitable inert filler are added to the reaction product of components (2) and (3) whereupon they are fully milled at a predetermined temperature, typically about 60 to 110° C., using a conventional mixer. After the mixture is cooled below the decomposition temperature of the polymerization initiator, the polymerization initiator (4) is added to the mixture. The contents are fully milled again to give an enclosure-forming rubber composition.

The enclosure layer is molded from the thus obtained rubber composition by well-known molding methods, for example, press molding and injection molding. The press molding method involves molding the rubber composition into sheets or half-cups in the unvulcanized or semi-vulcanized state, and encasing a spherical preform (which is a bare core or a core having another enclosure layer molded thereon from a different material) with the sheets or half-cups, followed by heat molding under pressure at a temperature of about 145 to 180° C. for about 10 to 30 minutes. In the case of rubber injection molding, the rubber composition in the unvulcanized or semi-vulcanized state is admitted into an injection molding machine whereby the composition is injected into a mold cavity where a preform has been set in place.

The enclosure layer of the inventive rubber composition thus formed is adjusted in hardness and thickness depending on the location of that layer, core diameter and other parameters. Where the enclosure layer is the cover of a two-piece golf ball or the outermost layer of the multilayer structure in three or multi-piece golf balls, it is recommended to form the enclosure layer to a JIS-C hardness of at least 65, especially at least 70 and up to 90, especially up to 85 and a thickness (or gage) of at least 0.5 mm, especially at least 1.0 mm and up to 3.5 mm, especially up to 2.5 mm. A choice of hardness and gage in these ranges ensures the manufacture of a golf ball which is improved in scuff resistance, durability against strikes, controllability and feel while maintaining a high resilience.

Where the enclosure layer of the invention is not the ball surface layer, but an intermediate layer between the core and the surface layer, it is recommended to form the enclosure layer to a JIS-C hardness of at least 65, especially at least 70 and up to 90, especially up to 85 and a thickness (or gage) of at least 0.5 mm, especially at least 1.0 mm and up to 3.5 mm, especially up to 2.5 mm. Even when the invention is applied to only the intermediate layer, a choice of hardness and gage in these ranges ensures the manufacture of a golf ball which is improved in scuff resistance, durability against strikes, controllability and feel while maintaining a high resilience.

In the golf ball of the invention, an additional enclosure layer or layers other than the enclosure layer of the rubber composition defined herein may be formed from well-known materials without departing from the spirit and scope of the invention. Such known materials include ethylenic ionomer resins, olefinic elastomers, polyester elastomers, polyurethane elastomers, polyamide elastomers, and blends thereof though not limited thereto. For the formation of the cover outermost layer of three or multi-piece golf balls, it is recommended to use an ethylenic ionomer resin.

The golf ball of the invention has numerous dimples formed on its outer surface. The ball surface is subjected to marking, painting and surface treatment, if necessary.

The inventive golf ball is for competition play and conforms with the Rules of Golf. That is, the ball may have a diameter of not less than 42.67 mm and a weight of not greater than 45.93 g.

EXAMPLE

Examples of the invention are given below by way of illustration and not by way of limitation.

Examples 1–8 and Comparative Examples 1–2

Two-piece golf balls (Examples 1–4, 8 and Comparative Examples 1–2) and three-piece golf balls (Examples 5–7) were manufactured using the core material, intermediate layer material and cover material shown in Tables 1, 2 and 3, respectively, in accordance with the combination shown in Table 4.

The golf balls were examined by the following tests, with the results shown in Table 4.

Core and Ball Hardness

Hardness was expressed by a deflection (mm) of the core or ball under an applied load of 100 kg.

JIS-C Hardness

A surface harness was measured by a JIS-C hardness meter.

Initial Velocity

An initial velocity was measured by a meter of the same type as approved by the USGA.

Distance

Using a swing robot by True Temper Co., the ball was hit with a driver (#1 Wood) at a head speed of 45 m/s. A total distance covered by the ball was measured.

Spin

Using the swing robot, the ball was hit with a sandwedge (SW) at a head speed of 20 m/s. A spin rate of the ball upon launching was measured.

Scuff Resistance

Using the swing robot, the ball was hit three times with a sandwedge (SW) at a head speed of 33 m/s. The ball surface was observed and rated according to the following criterion.

⊚: few flaw

○: some fluff on the cover, but generally acceptable

X: fluffy cover and scraped dimples

Durability Against Repetitive Strikes

Using the swing robot, ten balls for each Example were repetitively hit 300 times with a driver (#1 Wood) at a head speed of 40 m/s. The ball surface was observed and rated according to the following criterion.

⊚: not failed

Δ: less than 5 balls failed

X: 5 or more balls failed

Feel

Five professional golfers hit the ball with a driver (#1 Wood) and rated the feel according to the following criterion.

⊚: not too soft, not too hard, very good feel

○: average

X: too soft or too hard

Controllability

Five professional golfers hit the ball with No. 7 iron and rated ease of control according to the following criterion.

⊚: draw fade, ball control as intended, stop on the green as intended, and very satisfactory X: less spin, not travel in an intended curve, and not stop on the green as intended The materials used herein are shown below.

BR01: Japan Synthetic Rubber K.K., cis-1,4-polybutadiene rubber (cis-1,4-structure 96%)

IR2200: Japan Synthetic Rubber K.K., polyisoprene rubber

TP-301: Kurare K.K., trans-polyisoprene rubber

Himilan 1706: Dupont-Mitsui Polychemical K.K., zinc-neutralized ethylenic ionomer resin Himilan 1605: Dupont-Mitsui Polychemical K.K., sodium-neutralized ethylenic ionomer resin Surlyn 8120: Dupont, sodium-neutralized ethylenic flexible ionomer resin Methacrylic acid: Nippon Catalyst K.K., MQ-250

Zinc acrylate: Nippon Catalyst K.K., ZNDA-85S

Zinc oxide: Sakai Chemical K.K.

Peroxide: Nippon Oils and Fats K.K., dicumyl peroxide, trade name "Percumyl D" (flake industrial pure product 98%)

Hytrel 4047: Dupont-Toray K.K., thermoplastic polyester elastomer

TABLE 1

|   |   | Core |   |   |   |   |
|---|---|---|---|---|---|---|
|   |   | 1 | 2 | 3 | 4 | 5 |
| Core composition | BR01 | 100 | 100 | 100 | 100 | 100 |
|  | Zinc acrylate | 22 | 25.5 | 0 | 24.5 | 24.5 |
|  | Zinc oxide | 13.5 | 12 | 24.5 | 10.5 | 20.5 |
|  | Dicumyl peroxide | 1 | 1 | 1 | 1 | 1 |
|  | Methacrylic acid | 0 | 0 | 18 | 0 | 0 |
| Core | Hardness (mm) | 3.4 | 3 | 3.4 | 3 | 3 |
|  | Weight (g) | 32.2 | 32.2 | 32.2 | 24.4 | 25.8 |
|  | Outer diameter (mm) | 38.5 | 38.5 | 38.5 | 34.9 | 34.9 |

TABLE 2

|   |   | Intermediate layer |   |   |
|---|---|---|---|---|
|   |   | 1 | 2 | 3 |
| Intermediate layer composition | BR01 | 100 |  |  |
|  | Hytrel 4047 |  | 100 |  |
|  | Himilan 1706 |  |  | 50 |
|  | Himilan 1605 |  |  | 50 |
|  | Methacrylic acid | 22.5 |  |  |
|  | Zinc oxide | 21.9 |  |  |
|  | Dicumyl peroxide | 1.5 |  |  |
|  | Antioxidant | 0.2 |  |  |
|  | Titanium dioxide | 2.0 |  |  |
|  | Ultramarine | 0.3 |  |  |
| Intermediate layer | Thickness (mm) | 1.8 | 1.8 | 1.8 |
|  | Specific gravity | 1.13 | 1.13 | 1.13 |
|  | Surface JIS-C hardness | 78 | 65 | 90 |

TABLE 3

|   | Cover |  |  |  |  |  |
|---|---|---|---|---|---|---|
|   | 1 | 2 | 3 | 4 | 5 | 6 |
| Cover composition |  |  |  |  |  |  |
| BR01 | 100 | 95 | 95 | 100 | 40 |  |
| IR2200 |  | 5 | 5 |  |  |  |
| TP-301 |  |  |  |  | 60 |  |
| Himilan 1706 |  |  |  |  |  | 40 |
| Surlyn 8120 |  |  |  |  |  | 60 |
| Methacrylic acid | 22.5 | 22.5 | 22.5 |  |  |  |
| Zinc oxide | 21.9 | 21.9 | 21.9 |  | 5 |  |
| Zinc acrylate |  |  |  | 20 | 35 |  |
| Dicumyl peroxide | 1.5 | 1.5 | 2.3 | 1.5 | 1.0 |  |
| Antioxidant | 0.2 | 0.2 | 0.2 | 0.2 | 0.2 |  |
| Precipitated barium sulfate |  |  |  |  |  | 3.0 |
| Titanium dioxide | 2.0 | 2.0 | 2.0 | 2.0 | 17.0 | 2.0 |
| Ultramarine | 0.3 | 0.3 | 0.3 | 0.3 | 0.5 | 0.3 |
| Cover |  |  |  |  |  |  |
| Thickness (mm) | 2.1 | 2.1 | 2.1 | 2.1 | 2.1 | 2.1 |
| Specific gravity | 1.13 | 1.13 | 1.13 | 1.09 | 1.10 | 1.00 |
| Surface JIS-C hardness | 78 | 78 | 82 | 82 | 82 | 85 |

TABLE 4

|   | Example |  |  |  |  |  |  |  | Comparative Example |  |
|---|---|---|---|---|---|---|---|---|---|---|
|   | 1 | 2 | 3 | 4 | 5 | 6 | 7 | 8 | 1 | 2 |
| Constituents |  |  |  |  |  |  |  |  |  |  |
| Core | Core 1 | Core 2 | Core 1 | Core 1 | Core 4 | Core 4 | Core 5 | Core 3 | Core 1 | Core 1 |
| Intermediate layer |  |  |  |  | 1 | 2 | 3 |  |  |  |
| Cover | Cover 1 | Cover 1 | Cover 2 | Cover 3 | Cover 6 | Cover 3 | Cover 3 | Cover 3 | Cover 4 | Cover 5 |
| Core |  |  |  |  |  |  |  |  |  |  |
| Core weight (g) | 32.2 | 32.2 | 32.2 | 32.2 | 27.1 | 24.4 | 25.8 | 32.2 | 32.2 | 32.2 |
| Core hardness (mm) | 3.4 | 3.0 | 3.4 | 3.4 | 3.0 | 3.0 | 3.0 | 3.4 | 3.4 | 3.4 |
| Intermediate layer |  |  |  |  |  |  |  |  |  |  |
| Surface JIS-C hardness | — | — | — | — | Intermediate layer 78 | Intermediate layer 65 | Intermediate layer 90 | — | — | — |
| Cover |  |  |  |  |  |  |  |  |  |  |
| Surface JIS-C hardness | 78 | 78 | 78 | 82 | 85 | 82 | 82 | 82 | 82 | 82 |

TABLE 4-continued

|  | Example | | | | | | | | Comparative Example | |
|---|---|---|---|---|---|---|---|---|---|---|
|  | 1 | 2 | 3 | 4 | 5 | 6 | 7 | 8 | 1 | 2 |
| Ball |  |  |  |  |  |  |  |  |  |  |
| Outer diameter (mm) | 42.7 | 42.7 | 42.7 | 42.7 | 42.7 | 42.7 | 42.7 | 42.7 | 42.7 | 42.7 |
| Weight (g) | 45.3 | 45.3 | 45.3 | 45.3 | 45.3 | 45.3 | 45.3 | 45.3 | 44.9 | 45 |
| Hardness (mm) | 3.2 | 2.8 | 3.2 | 2.8 | 3.0 | 3.1 | 2.8 | 3.2 | 3.2 | 3.2 |
| Ball performance |  |  |  |  |  |  |  |  |  |  |
| Initial velocity (m/s) | 77.2 | 77.5 | 77.1 | 77.0 | 77.0 | 77.0 | 77.1 | 75.0 | 77.3 | 76.8 |
| Distance (m) | 231 | 233 | 230 | 230 | 230 | 230 | 231 | 210 | 230 | 226 |
| Spin (rpm) | 6200 | 6400 | 6100 | 6000 | 5800 | 6100 | 5900 | 6000 | 6000 | 6010 |
| Scuff resistance | ◎ | ◎ | ◎ | ◎ | ○ | ◎ | ◎ | ◎ | x | x |
| Durability against repetitive strikes | ◎ | ◎ | ◎ | ◎ | ◎ | ◎ | ◎ | ◎ | x | Δ |
| Feel | ◎ | ◎ | ◎ | ◎ | ◎ | ◎ | ◎ | ○ | ◎ | ◎ |
| Controllability | ◎ | ◎ | ◎ | ◎ | ◎ | ◎ | ◎ | ◎ | ◎ | ◎ |

As seen from Table 4, the golf balls of Examples 1 to 8 remain highly durable against flaw and repetitive strikes, give a pleasant feel when hit, and are easy to control. By contrast, the golf ball of Comparative Example 1 is poor in scuff resistance and durability against repetitive strikes. The golf ball of Comparative Example 2 having a cover with a high content of trans-polyisoprene rubber is less resilient, short in distance, and poor in scuff resistance and durability against repetitive strikes.

There has been described a golf ball comprising a core and an improved enclosure, which ball has a great resilience or rebound and a pleasant feel and is controllable upon iron shots as intended and highly resistant against flaw on the cover surface.

Japanese Patent Application No. 11-193565 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A two piece golf ball consisting of a core and a cover, wherein said cover is formed of a rubber composition comprising 100 parts by weight of a base rubber based on polybutadiene having at least 40% of cis-1,4-structure, 5 to 40 parts by weight of an α,β-unsaturated carboxylic acid, 5 to 40 parts by weight of a metal oxide, and 0.1 to 5 parts by weight of a polymerization initiator, the rubber composition being subjected to crosslinking reaction;

wherein said core is formed of a rubber composition comprising 100 parts by weight of a base rubber based on polybutadiene having at least 40% of cis-1,4-structure, 5 to 40 parts by weight of a metal salt of an α,β-unsaturated carboxylic acid, 0 to 40 parts by weight of a metal oxide, and 0.1 to 5 parts by weight of a polymerization initiator, the rubber composition being subjected to crosslinking reaction.

2. The golf ball of claim 1 wherein the base rubber contains at least 50% by weight of polybutadiene.

3. The golf ball of claim 1 wherein the α,β-unsaturated carboxylic acid is methacrylic acid.

4. The golf ball of claim 1 wherein the metal oxide is zinc oxide.

5. The golf ball of claim 1 wherein the rubber composition contains the α,β-unsaturated carboxylic acid and the metal oxide in a molar ratio from 3:1 to 1:1.

6. The golf ball of claim 5 wherein the rubber composition contains the α,β-unsaturated carboxylic acid and the metal oxide in a molar ratio from 2:1 to 1:1.

7. The golf ball of claim 1 wherein the polymerization initiator is an organic peroxide.

8. The golf ball of claim 1 wherein in the rubber composition of which said core is formed, the base rubber contains at least 50% by weight of polybutadiene.

9. The golf ball of claim 1 wherein in the rubber composition of which said core is formed, the polymerization initiator is an organic peroxide.

10. A three-piece golf ball consisting of a core, an intermediate layer and a cover, wherein said cover is formed of a rubber composition comprising 100 parts by weight of a base rubber based on polybutadiene having at least 40% of cis-1,4-structure, 5 to 40 parts by weight of an α,β-unsaturated carboxylic acid, 5 to 40 parts by weight of a metal oxide, and 0.1 to 5 parts by weight of a polymerization initiator, the rubber composition being subjected to crosslinking reaction;

wherein said core is formed of a rubber composition comprising 100 parts by weight of a base rubber based on polybutadiene having at least 40% of cis-1,4-structure, 5 to 40 parts by weight of a metal salt of an α,β-unsaturated carboxylic acid, 0 to 40 parts by weight of a metal oxide, and 0.1 to 5 parts by weight of a polymerization initiator, the rubber composition being subjected to crosslinking reaction.

* * * * *